(12) United States Patent
Sankar et al.

(10) Patent No.: US 12,728,673 B2
(45) Date of Patent: Sep. 8, 2026

(54) GROOVE BENEATH SIPE

(71) Applicant: APOLLO TYRES GLOBAL R&D B.V., Enschede (NL)

(72) Inventors: T Muthu Siva Sankar, Enschede (NL); Kashyap Krishna, Enschede (NL); Mihar Mukesh Mavji Ved, Enschede (NL); Baburaj Cv, Tamilnadu (IN); R. Sureshkumar, Tamilnadu (IN); Jonathan Israel Rangel Paez, Enschede (NL); Silambuselvan Thangaraj, Enschede (NL); Sanjaykumar Patel, Enschede (NL); Alessandro Ercoli, Enschede (NL)

(73) Assignee: APOLLO TYRES GLOBAL R&D B.V., Enschede (NL)

( * ) Notice: Subject to any disclaimer, the term of this patent is extended or adjusted under 35 U.S.C. 154(b) by 242 days.

(21) Appl. No.: 18/043,228

(22) PCT Filed: Aug. 27, 2021

(86) PCT No.: PCT/EP2021/073769
§ 371 (c)(1),
(2) Date: Feb. 27, 2023

(87) PCT Pub. No.: WO2022/043508
PCT Pub. Date: Mar. 3, 2022

(65) Prior Publication Data

US 2024/0025212 A1 Jan. 25, 2024

(30) Foreign Application Priority Data

Aug. 28, 2020 (LU) .................................. LU102032

(51) Int. Cl.
*B60C 11/12* (2006.01)
*B60C 11/03* (2006.01)
*B29D 30/06* (2006.01)

(52) U.S. Cl.
CPC ...... *B60C 11/1281* (2013.01); *B60C 11/0323* (2013.01); *B60C 11/1218* (2013.01);
(Continued)

(58) Field of Classification Search
CPC ............... B60C 11/1281; B60C 11/124; B60C 11/0323; B60C 2011/1213; B29D 2030/0613; B29D 2030/061
See application file for complete search history.

(56) References Cited

U.S. PATENT DOCUMENTS 6,315,018 B1 * 11/2001 Watanabe ........... B60C 11/0306 152/DIG. 3
10,343,465 B2 7/2019 Matsuyama
(Continued)

FOREIGN PATENT DOCUMENTS

EP 0917970 A2 5/1999
EP 2072286 A1 6/2009
(Continued)

OTHER PUBLICATIONS

Machine translation for Japan 01-101205 (Year: 2024).*
(Continued)

*Primary Examiner* — Steven D Maki
(74) *Attorney, Agent, or Firm* — RENNER, OTTO, BOISSELLE & SKLAR, LLP

(57) ABSTRACT

The invention relates to a tyre (1), the tyre (1) comprising: a tread (2) having a tread surface (3) for contacting the ground and at least one groove-like recess (4) therein forming a free space (5), the recess (4) having a longitudinal extension A along the surface (3) and a depth B measured in
(Continued)

a radial direction with respect to a radial axis (X) of the tyre (1) from the tread surface (3) to a radially innermost position (19), wherein the free space (5) can be divided into a sipe portion (6) opening to the tread surface (3) and a groove portion (7) located radially inwards the sipe portion (6), wherein in a cross sectional view transverse to the longitudinal extension A of the recess (4) the groove portion (7) has a groove contour (9), with a longitudinal axis (X'), wherein a corresponding width of the groove contour (9) has a local maximum Wg at a height H referred to a spatial extent E of the groove contour (9) in the direction of this longitudinal axis (X') and wherein the groove portion (7) has at least one transition section along the longitudinal extension A of the recess (4), between the ends (17, 18), wherein the height H of the groove portion (7) changes by an amount ΔH. The invention further relates to a corresponding wheel for an automobile comprising such kind of tyre (1), a blade (11) for forming a part of a corresponding tyre moulding form and a corresponding moulding form.

10 Claims, 8 Drawing Sheets

(52) U.S. Cl.
CPC ...... *B60C 11/124* (2013.01); *B29D 2030/061* (2013.01); *B29D 2030/0613* (2013.01); *B60C 2011/1213* (2013.01)

(56) References Cited

U.S. PATENT DOCUMENTS

2012/0234443 A1* 9/2012 Kurokawa .......... B60C 11/1281
152/209.18
2015/0165828 A1 6/2015 Kaji
2016/0318347 A1 11/2016 Bardin et al.
2018/0104992 A1 4/2018 Vantal et al.
2018/0326794 A1* 11/2018 Collett ................ B60C 11/0323
2020/0298628 A1 9/2020 Tomida
2022/0009291 A1* 1/2022 Voss .................... B60C 11/1218

FOREIGN PATENT DOCUMENTS

EP 1782970 B1 7/2010
EP 2492117 A1 8/2012
EP 2726303 B1 3/2017
EP 3094502 B1 5/2019
EP 3277521 B1 8/2019
EP 3535141 A1 9/2019
EP 3543038 A1 9/2019
EP 3187346 B1 1/2020
EP 3621826 A1 3/2020
JP 01-101205 A * 4/1989
JP 09-323510 A * 12/1997
JP 2001-001722 A * 1/2001 ......... B60C 11/1218
JP 2005-161967 A * 6/2005
JP 2005-193770 A * 7/2005 ......... B60C 11/1218
KR 100869025 B1 11/2008
KR 101411093 B1 7/2014
WO 2018083417 A1 5/2018
WO 2018101933 A1 6/2018
WO 2018206175 A1 11/2018
WO 2019108173 A1 6/2019
WO 2019117090 A1 6/2019

OTHER PUBLICATIONS

Machine translation for Japan 2001-001722 (Year: 2024).*
Machine translation for Japan 2005-161967 (Year: 2024).*
Machine translation for Japan 2005-193770 (Year: 2024).*
Machine translation for Japan 09-323510 (Year: 2025).*
International Search Report and Written Opinion for corresponding Application No. PCT/EP2021/073769 issued on Oct. 28, 2021.
Luxembourg Search Report and Written Opinion for corresponding Application No. LU102032 issued Mar. 24, 2021.
International Preliminary Report on Patentability for corresponding Application No. PCT/EP2021/073769 issued on Feb. 28, 2023.

* cited by examiner

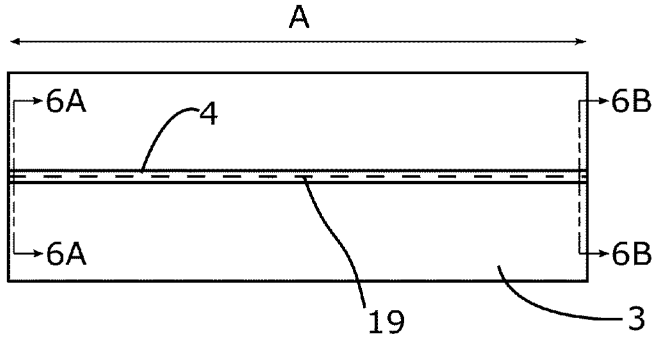
Fig. 5
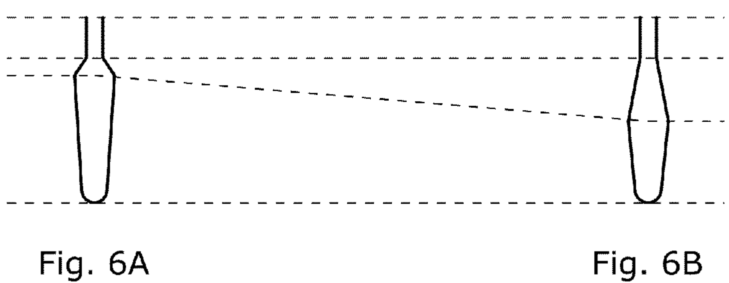
Fig. 6A
Fig. 6B
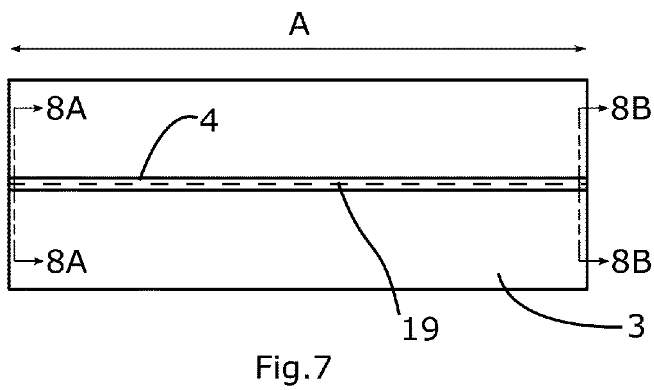
Fig.7

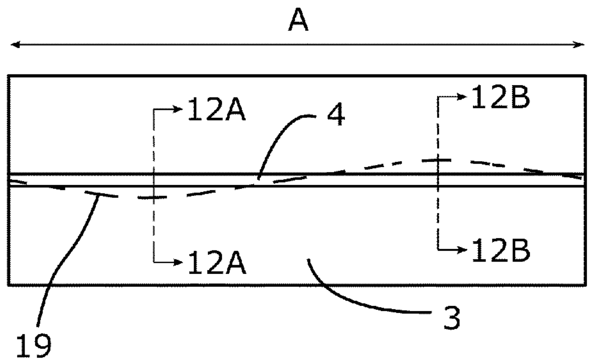
Fig.11
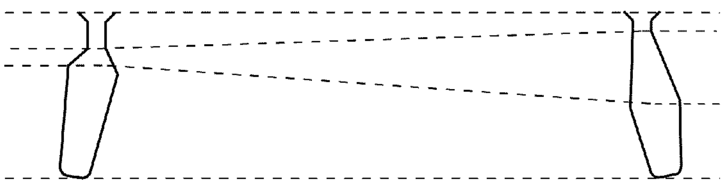
Fig. 12A
Fig. 12B
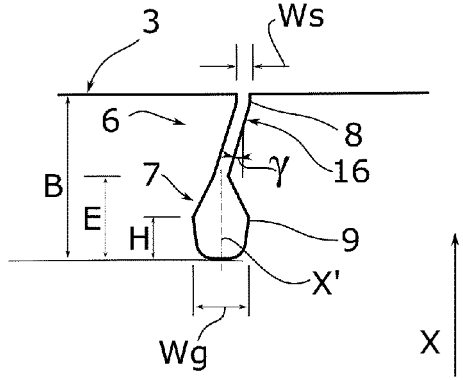
Fig.13

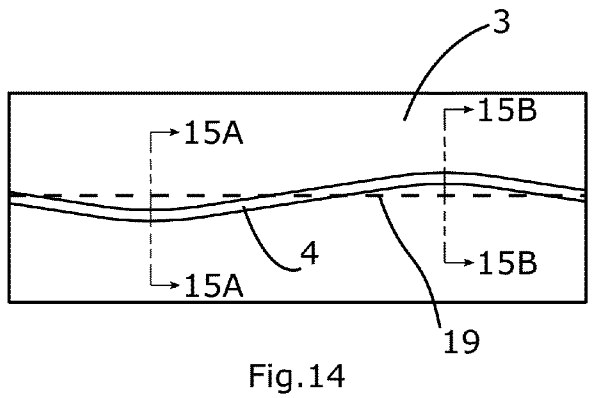
Fig.14
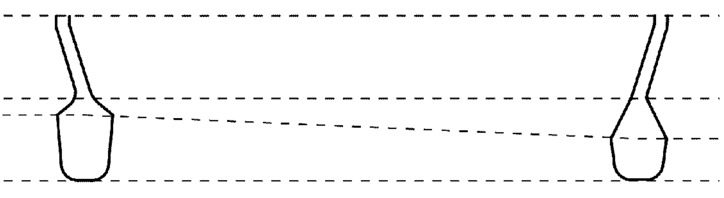
Fig. 15A
Fig. 15B
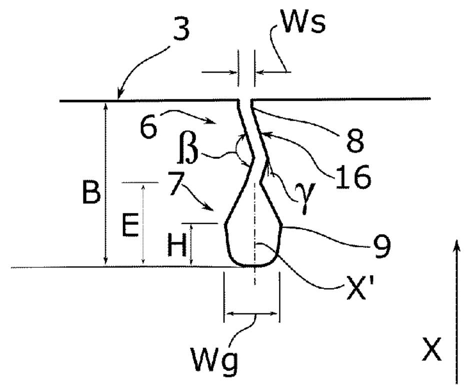
Fig.16

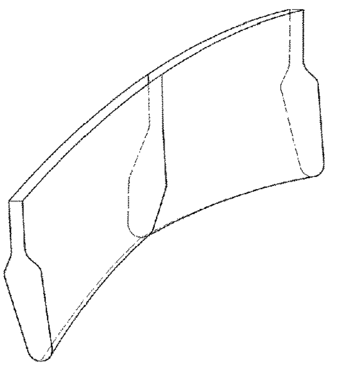
Fig.18
Fig.19
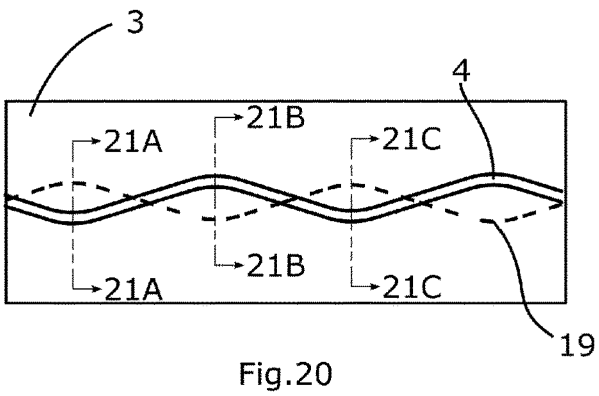
Fig.20
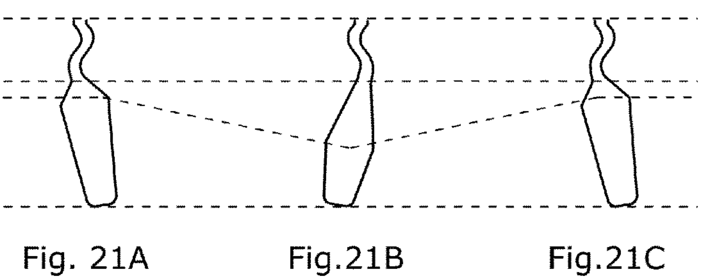
Fig. 21A Fig.21B Fig.21C

GROOVE BENEATH SIPE

This application is a national phase of International Application No. PCT/EP2021/073769 filed Aug. 27, 2021, which claims priority to Luxembourg Application No. LU102032 filed Aug. 28, 2020, each of which is hereby incorporated herein by reference in its entirety.

FIELD OF THE INVENTION

The present invention relates to a pneumatic tyre of vehicle having a tread with a novel groove structure for enhanced grip over the wear life of the tread. The present invention further relates to a corresponding wheel, a blade for mounting inside a tyre moulding form to produce the novel groove structure and to a tyre moulding form for vulcanizing a green tyre.

BACKGROUND OF THE INVENTION

A tyre having a tread with a groove structure is for instance disclosed in EP 2 726 303 B1, the tyre having a tread with a groove structure for enhanced wet and snow traction. The groove includes an upper portion and a lower portion that can provide enhanced wet and snow traction over various stages of tread wear without unnecessary compromise to the tread rigidity. The lower portion includes one more voids for the accumulation and/or evacuation of fluids.

Document EP 2 072 286 discloses a sipe design wherein the sipe has a first portion, a second radiused portion, and a transition section located between the first portion and the groove portion, the transition section having a curved surface with an outer radius that has a center external to the sipe. In variations of the prior art, the sipe may have a first portion that may also be curved or have three dimensional projections, or combinations thereof.

The document EP 3 094 502 also describes an evolving tyre tread for heavy goods vehicles. This tread comprises at least one cutout opening to the initial state (tread is not worn and fresh) on the running surface when new, this cutout being characterized in that it comprises several parts bonded together.

Other disclosed documents may be considered such as EP3621826A1, EP3277521B1, EP1782970B1, US2015165828B2, EP3187346B1, U.S. Pat. No. 10,343,465B2, EP3277521B1, EP3535141A1, WO2019117090A1 and WO2019117091A1.

Tyres have changing performance throughout their service life. Environmental conditions, fatigue and wear have a major influence on grip performance when a tyre is rolling on an underground. For worn tyres, wet stopping distance typically increases, the response time of tyres during cornering or manoeuvring increases. Tyres are generally equipped with geometric physical features or a construction of the tread compound that prevents the drop in wet performance on worn tyres. Physical features typically consist of a radially transforming cross-section provided to sipes in a tread block.

Regardless of the category of tyre (that is to say that this is a tyre fitted to a passenger vehicle or a vehicle intended to carry goods and heavy loads), the tread should have a drainage performance of the water present on the route which is always above a minimum performance called safety performance. Accordingly, and taking into account the progressive wear of the tread which reduces progressively the cross sections of the grooves, and thus the capacity of these grooves to discharge a volume of liquid, it is usual to make grooves opening onto the rolling surface when new and being extended in the thickness of the tread to at least a level corresponding to a legal limit.

It is important for tyres to provide good traction when the vehicle is driven along an underground. Tyres may be used on passenger or commercial vehicles over a variety of driving conditions such as wet and/or dry and or snow depending on the season and/or geographic location. Accordingly, tyres have frequently been provided with various features in an effort enhance traction under such conditions. For example, sipes and grooves may be provided that create edges to improve snow traction and to provide for accumulation and evacuation of fluids to improve wet traction.

Tyres have changing performance throughout their service life. When the tyre wears during service it becomes more rigid and decreased groove volume results in loss of wet performance. The addition of various features to improve wet and snow traction may adversely affect other aspects of tyre performance. For example, the addition of grooves can reduce the rigidity of the tread. Such reduced rigidity can have an undesired impact on e.g., wear, rolling resistance, and other characteristics. Any losses in grip performance should be avoided or limited at least, also for a worn tyre.

There is a permanent need for providing a tyre with a good grip to an underground.

The present invention has for its object to present measures for providing a tyre with an improved grip to an underground. A further objective is to retain wet performance after wear (loss of groove volume).

SUMMARY OF THE INVENTION

In a first aspect, the invention provides a tyre, the tyre comprising: a tread having a tread surface for contacting the ground and at least one groove-like recess therein forming a free space, the recess having a longitudinal extension A along the surface and a depth B measured in a radial direction with respect to a radial axis X of the tyre from the tread surface to a radially innermost position, the recess having a first end and a second end, the ends being opposite to each other along the longitudinal extension A, wherein the free space can be divided into a sipe portion opening to the tread surface and a groove portion located beneath and radially inwards the sipe portion, wherein in a cross sectional view transverse to the longitudinal extension A of the recess the sipe portion has a sipe contour and the groove portion has a groove contour with a longitudinal axis X', wherein a corresponding width of the grove contour has at least one local maximum Wg at a height H referred to a spatial extent E of the groove contour in the direction of this longitudinal axis X', wherein the resulting maximum width of the groove contour is bigger than a maximum width of the sipe contour. The groove portion has at least one transition section along the longitudinal extension A of the recess, between the ends, wherein the height H of the groove portion changes in this at least one transition section by an amount $\Delta H$, wherein for the ratio $\Delta H/B$ of the amount $\Delta H$ to the depth B applies $\Delta H/B \geq 0.1$. It has been found that such a change in the height H of the groove portion has a positive effect on the grip of the tire. The depth B is constant or at least substantially constant in the vast majority of embodiments. In case of doubt, the ratio $\Delta H/B$ refers to the corresponding quantities as they occur locally (local ratio $\Delta H/B$). In case the depth B is constant, this also corresponds exactly to the global ratio $\Delta H/B$—otherwise only essentially.

It is intended that for the at least one transition section, a change is provided in the height H by an amount $\Delta H$ with reference to the depth B, such that the height H on one end of the transition section is significantly greater or significantly smaller than the height H on the opposite end of the transition section. In embodiments, the at least one transition section may be provided extending along the entire longitudinal extension A of the recess, between the ends of said recess.

In preferred embodiments, the height H changes along the at least one transition section by an amount $\Delta H$ in the range of from 0.4 mm to 6 mm. For the at least one transition, the height H may change by an amount $\Delta H$ along the extension A of the recess at a constant rate. The height H may change as an algebraic function, for example a polynomial function of the distance along the transition section. The height H may change as transcendental function, for example hyperbolic, periodic, logarithmic or exponential function. It is within the purview of the skilled person to select the function of the rate of change.

In one aspect of the invention, the groove portion has a plurality of the transition sections, wherein the number of transition sections is in the range of 2 to 250. According to the invention, a transition may be defined as a change, along the longitudinal extension A of the recess, of the geometry of the cross sectional contour of the groove portion. For example, the groove portion of the recess may have one or more transitions of the ratio $\Delta H/B$ along the longitudinal extension A of the recess. In one preferred aspect of the invention, a tyre for heavy goods vehicles may have one or more transitions per pitch. In one preferred aspect of the invention, a high performance tyre for a passenger vehicle may have one or more transitions per block. Preferably, the distance along the length of the recess between two consecutive transitions is at least 1 mm, more preferably at least 3 mm.

In another aspect of the invention, for the ratio $\Delta H/B$ of the amount $\Delta H$ to the depth B applies $\Delta H/B \geq 0.2$. In some applications the grip of the tyre is significantly improved at $\Delta H/B=0.2$ or more.

In another aspect of the invention, for the at least one transition section the extent E changes by an amount $\Delta E$. For the ratio $\Delta E/B$ of the amount $\Delta E$ to the depth B applies $\Delta E/B \geq 0.01$. In some applications, the grip is significantly improved for $\Delta E/B$ in the range of 0.01 to 0.4.

In another aspect of the invention, $\Delta E/B=0.05$ or more. For some applications the grip is improved for $\Delta E/B=0.05$ or more. Preferably, $\Delta E/B$ may be in the range of 0.1 to 0.25.

In another aspect of the invention, for the at least one transition section the local maximum width Wg increases in the range of more than 5% to less than 40%. Preferably, the local maximum width Wg increases along the transition section of the recess by less than 30%, more preferred from 10% to 20%. The width Wg is understood to increase along the extension A of the recess, from the cross sectional contour 9 having the smallest Wg to the widest cross sectional contour 9 within the transition section.

In another aspect of the invention, the longitudinal axis X' of the groove contour is inclined with respect to the radial axis X of the tyre with an inclination angle $\alpha$ in the range $-30° \leq \alpha \leq 30°$. The inclination angle $\alpha$ in the range of from $-30°$ to $30°$ provides for advantageous wet performance after wear. Preferably, the axis X' may be inclined in the range of $-20° \leq \alpha \leq 20°$, more preferred $-15° \leq \alpha \leq 15°$. The inclination angle $\alpha$ is not equal to 0° ($\alpha \neq 0°$), at least in some areas along the longitudinal extension.

In another aspect of the invention, the inclination angle $\alpha$ changes in the range $-30° \leq \alpha \leq 30°$ so as to form a profile path for the radially innermost position of a zigzag, wavy, sinusoidal or stepped configuration or a combination thereof. In this embodiment of the invention, since the change of the inclination angle $\alpha$ is relatively moderate, it is quite reasonable to say that the depth B is essentially constant, since cosine (30°)=0.866 applies.

In another aspect, the invention further relates to a wheel for an automobile comprising a tyre rim for being connected to an axle of the automobile and a tyre which may be designed as previously described connected to the tire rim. The wheel may be further designed as aforesaid described. Due to the same mathematical value of subsequent portions or parts of the groove-like recess provided by the respective blade in radial direction and/or width direction bigger and smaller protrusion/depression of adjacent tread elements spaced to each other by the recess are provided leading to improved grip to an underground.

In another aspect, the invention provides a blade for forming a part of a tyre moulding form to produce a groove-like recess with a corresponding free space in a tyre tread of a tyre, moulded by the moulding form, the blade having a longitudinal extension AB and a depth BB measured in a radial direction with respect to a radial axis Y of the tyre mould and comprising: a first blade portion for forming a sipe portion of the free space, and a second blade portion for forming a groove portion of the free space, said second blade portion connected to the first blade portion radially inwards the first blade portion, wherein in a cross sectional view transverse to the longitudinal extension AB of the blade, the first blade portion has a first blade contour and the second blade portion has a second blade contour with a longitudinal axis Y', wherein a corresponding width of the second blade contour has a local maximum WBg at a height HB referred to a spatial extent EB of the second blade contour in the direction of this longitudinal axis Y', wherein the resulting maximum width of the second blade contour is bigger than a maximum width of the first blade contour. The second blade portion has at least one transition section along the longitudinal extension AB of the blade wherein the height HB changes in this transition section by an amount $\Delta HB$, wherein for the ratio $\Delta HB/BB$ of the amount $\Delta HB$ to the extension BB applies $\Delta HB/BB \geq 0.1$. Due to the same mathematical value of subsequent portions or parts of the groove-like recess provided by the respective blade in radial direction and/or width direction bigger and smaller protrusion/depression of adjacent tread elements spaced to each other by the recess are provided leading to improved grip to an underground.

In one aspect of the blade according to the invention, the longitudinal axis Y' of the second groove contour is inclined with respect to the radial axis Y of the tyre mould with an inclination angle $\alpha'$ (analogous to the above-mentioned inclination angle $\alpha$ of the tyre) in the range $-30° \leq \alpha' \leq 30°$. The inclination angle $\alpha'$ is not equal to 0° ($\alpha' \neq 0°$), at least in some areas along the longitudinal extension. Preferably, the axis Y' may be inclined in the range of $-20° \leq \alpha' \leq 20°$, more preferred $-15° \leq \alpha' \leq 15°$. Especially, the inclination angle $\alpha'$ changes in the range $-30° \leq \alpha' \leq 30°$ so as to form a profile path for the radially innermost position of a zigzag, wavy, sinusoidal or stepped configuration or a combination thereof. In this embodiment of the invention, since the change of the inclination angle $\alpha'$ is relatively moderate, it is quite reasonable to say that the depth BB is essentially constant, since cosine (30°)=0.866 applies.

In another aspect, the invention further relates to a moulding form for vulcanizing a green tyre for a tyre which may be designed as previously described, comprising: a mould casing for receiving a rubber material and at least one blade which may be designed as previously described protruding radially inwards from the mould casing for forming the at least one groove-like recess into the rubber material. The moulding form may be further designed as aforesaid described. Due to the same mathematical value of subsequent portions or parts of the groove-like recess provided by the respective blade in radial direction and/or width direction bigger and smaller protrusion/depression of adjacent blocks spaced to each other by the recess are provided leading to improved grip to an underground.

The groove contour of the recess may also be referred to as evolving groove, or groove beneath the sipe or hidden groove. The invention thus provides for a novel tyre tread design in which the grooves evolve from underneath the sipes as tyre wears. The grooves beneath the sipes may have cross-sectional contours with walls of different geometries, such as aerofoil shape, hyperbolic paraboloid “pringle” shape, hexagonal shape or any other polygonal shaped contour, cycloidal, involute, evolute, hypocloid, epicycloid, peanut shape, pasta contours, teardrop, or hooves and combinations thereof.

Definitions

The following definitions are controlling for the disclosed invention.

“Tyre” means all types of elastic bandages subjected to internal pressure or not.

“Tread” of a tyre means a quantity of rubber material delimited by side surfaces and by two main surfaces, one of which is intended to come into contact with an underground when the tyre is rolling.

“Tread surface” means all the points of the tread which are in contact with an underground when the tyre, inflated to its reference pressure rolls on the roadway. The reference inflation pressure is defined in the conditions of use of the tire as defined in particular by the ETRTO standard (“European Tire and Rim Technical Organization”).

“Blade” means a protrusion in a tyre curing mould that forms part of the tread design. The protrusion forms a corresponding depression in the finished tyre tread.

“Recess” means an elongated free space or void in a tread that may extend along the tread surface circumferentially or laterally about the tread in a straight, curved, stepped or zigzag manner. Circumferentially and laterally extending recesses sometimes have common portions and are sub classified as “sipe” and “groove”.

“Groove” means an elongated void area in a tread that may extend longitudinally or circumferentially or may extend laterally about the tread in a straight, curved, wavy, stepped or zigzag manner. Grooves may be of varying depths in a tyre. As used herein, the term “circumferential groove” refers to continuous longitudinal grooves which are oriented in the circumferential direction.

“Circumferential direction” means the direction along the tyre rolling movement. As used herein, the term “axial direction” refers to the direction along the tyre axis. As used herein, the term “radial direction”, “radial” and “radially” refer to the direction toward or away from the axis of rotation of the tyre to the tread. The term “depth” and “depth direction” refers to the direction toward the axis of rotation of the tyre.

“Sipes” means a narrow groove or an incision in the ground contacting surface of a tread, being relatively small with respect to the grooves. The width of a sipe is such that the sipe may close completely in a tyre footprint. Sipes may have the same amplitude and wavelength between sizes, wherein the total length or the number of waves can differ. Usually, depending on tread width, larger tread elements comprise longer sipes.

“Pitch” means a repetitious geometrical pattern of a tyre tread that is arranged in a circular array about the circumference of a tyre.

BRIEF DESCRIPTION OF THE DRAWINGS

The invention will now be described by way of example and with reference to the accompanying drawings in which:

FIG. 5 is a top view of the first embodiment of the groove-like recess;

FIGS. 6A and 6B are sectional views of a groove-like recess along the corresponding lines in FIG. 5;

FIG. 7 is a top view of a second embodiment of the groove-like recess;

FIG. 11 is a top view of a fifth embodiment of the groove-like recess;

FIGS. 12A and 12B are sectional views of a groove-like recess along the corresponding lines in FIG. 11;

FIG. 13 is a sectional view of a ninth embodiment of the groove-like recess according to the invention;

FIG. 14 is a top view of a tenth embodiment of the groove-like recess;

FIGS. 15A and 15B are sectional views of a groove-like recess along the corresponding lines in FIG. 14;

FIG. 16 is a sectional view of another groove-like recess according to the eleventh embodiment of the invention;

FIG. 18 is a perspective view of another exemplary blade used to form one embodiment of the invention according to the examples;

FIG. 19 is a perspective view of another exemplary blade used in the examples;

FIG. 20 is a top view of another embodiment of the groove-like recess;

FIGS. 21A-21C are sectional views of a groove-like recess along the corresponding lines in FIG. 20.

DETAILED DESCRIPTION OF THE INVENTION

Figure 1:
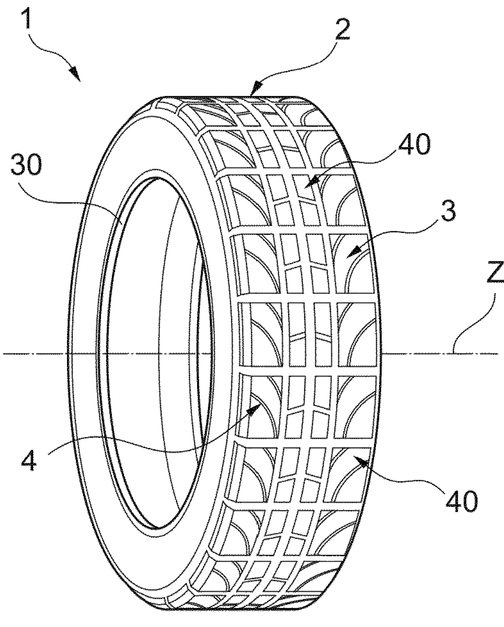
FIG. 1 is a schematic perspective view of a tire for a wheel of an automobile.

Hereinafter, preferred embodiments of the present invention will be described in detail with reference to the accompanying drawings, so as to assist those having ordinary skill in the art in a comprehensive understanding of the invention, and the present invention is not limited to the embodiments disclosed below. In the embodiments of the present invention, publicly known functions and configurations that are judged to be able to make the purport of the present invention unnecessarily obscure will not be described. Referring to the drawings, wherein like reference characters designate like or corresponding parts throughout the several views.

The tyre 1 as illustrated in FIG. 1 comprises a connecting part 30 by means of which the tyre 1 can be connected to a tyre rim of a vehicle wheel. The tyre 1 is rotatable around a turning tyre axis Z. The tyre 1 comprises at its radial outer end a tread 2 having a tread surface 3 for contacting the ground provided by a plurality of tread elements 40 arranged at different regions of the outer curved surface area of the tyre 1. The tyre comprises at least one groove-like recess 4 that may be located within a tread element or between tread elements.

In the illustrated embodiment of FIG. 1 the tyre 1 is a directional tyre. In the alternate the tyre 1 may be a non-directional tyre. As also appreciated by those skilled in the art, in the illustrated embodiment the tyre 1 may be a tyre for a passenger vehicle. In the alternate, the tyre 1 may be a heavy duty tyre suitable for a vehicle carrying heavy loads, such as for example a truck tyre or a bus tyre.

Figure 2:
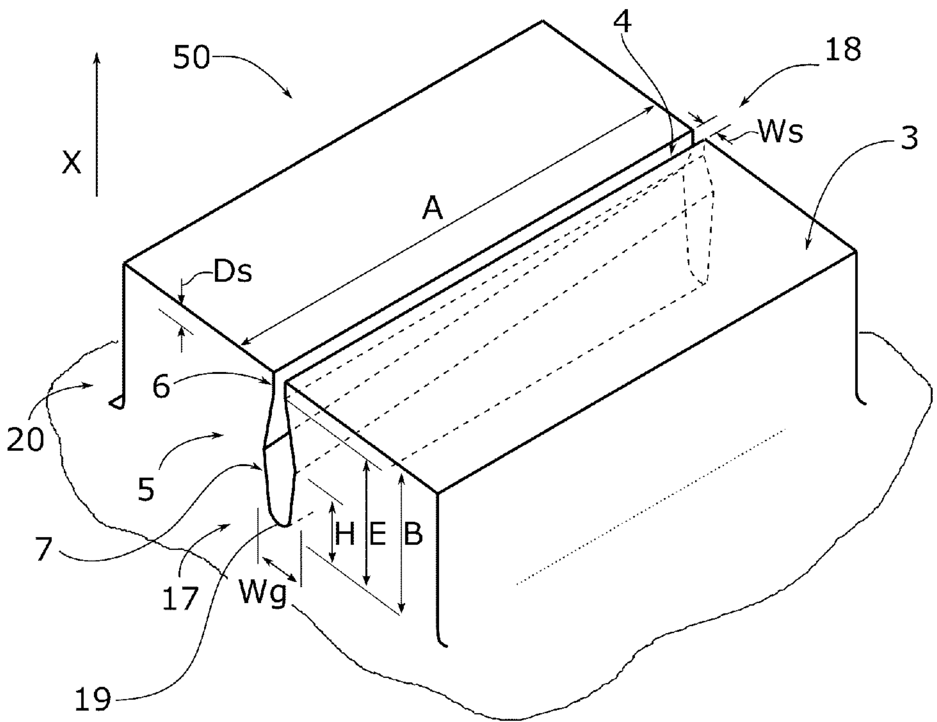
FIG. 2 is a perspective view of a groove-like recess according to the invention.

FIG. 2 is a tread element 50 for a pneumatic tyre tread 2. As appreciated by those skilled in the art, the tread element 50 is formed by at least one groove 20, the groove 20 being either a circumferentially extending or laterally extending groove. If the tread element 50 is defined by only circumferentially extending grooves, the tread element will be a tread rib. If the tread element 50 is formed by grooves on at least three sides, the tread element 50 is considered a tread block. The tread element 50 may be located in any position on the tread surface, i.e. along a tread shoulder, along the centerline, or an intermediate position.

Located within the tread element 50 is at least one groove-like recess 4 extending along the surface 3 creating a free space 5 is illustrated as subdividing the tread element 50 into two portions, see FIG. 2; however, the tread element 50 may have multiple groove-like recesses 4. The groove-like recess 4 may have a general inclination in either the axial or circumferential direction of the tire; the exact orientation of the recess 4 relative to the tread 2 is within the purview of the skilled person.

Figure 3:
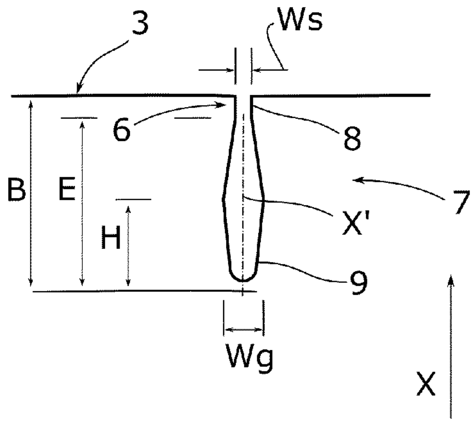
FIG. 3 is a sectional view of a first embodiment of the groove-like recess along the sectional plane of the end 17 of FIG. 2.

The groove-like recess 4 has a longitudinal extension A between the ends 17, 18 as shown in the embodiment of FIG. 2. The sipe portion 6 has a sipe width Ws and a depth Ds. A groove portion 7 is located beneath the sipe portion 6 radially inwards and has at least one local maximum Wg at a height H referred to a spatial extent E. It is shown a groove contour maximum width Wg wider than a sipe contour width Ws. In a cross section, the sipe portion 6 and the groove portion 7 have a contour 8,9 wherein the groove contour 9 has an axis X', see FIG. 3. The spatial extent E of the groove contour 9 is measured in the direction of this longitudinal axis X'.

The ends 17, 18 may be defined at the edges of the a tread element 50. In embodiments, for a recess 4 extending in the axial direction at least one end of the recess may terminate without opening to a groove 20. In embodiments, the axially extending recess 4 has ends 17, 18 that do not open to a groove 20. The longitudinal extension A of the recess 4 may be selected considering the orientation of the recess 4 within the tread element 50. For the recess 4 having general inclination in the circumferential direction, the skilled person could have within her purview to define the extension A as a multiple of one pitch length. In the alternate, the recess 4 may have a general inclination in a substantially axial direction of the tyre. For such embodiments the longitudinal extension A may be the shoulder width, or the intermediate block width, or the central block width.

The groove-like recess has a depth B measured in a radial direction with respect to a radial axis X of the tyre 1 from the tread surface 3 to a radially innermost position 19, see FIG. 2. In embodiments, the depth B may be defined by B=Ds+E.

The depth of the grooves 20 forming the tire tread element 50 defines the NSD of the tread. If there are grooves of differing depths, the maximum groove depth will define the non-skid depth of the tread. According to one embodiment shown in FIG. 2 the depth B of the recess 4 may be less than the non-skid depth NSD. In embodiments, the spatial extent E may be determined by E=NSD−Ds−c, wherein c is a radial distance that may be selected in the range of 0 mm to 3 mm, for example 1.8 mm. The depth B of the recess may range from 50% to 100% of a non-skid depth (NSD).

In preferred embodiments, a tyre 1 may be provided with a tread 2 having a NSD in the range of more than 6 mm to less than 19 mm. NSD may be equal or larger than B as described later. For a passenger vehicle, a NSD of about 6 mm is considered advantageous for improved rolling resistance, but typical values may be in the range of more than 6 mm to less than 10 mm. Sports utility vehicles and light trucks may be provided with a tyre 1 having a NSD in the range of more than 8 mm to less than 14 mm. A heavy duty tyre 1 may have a NSD in the range of more than 12 mm to less than 19 mm.

Figure 4:
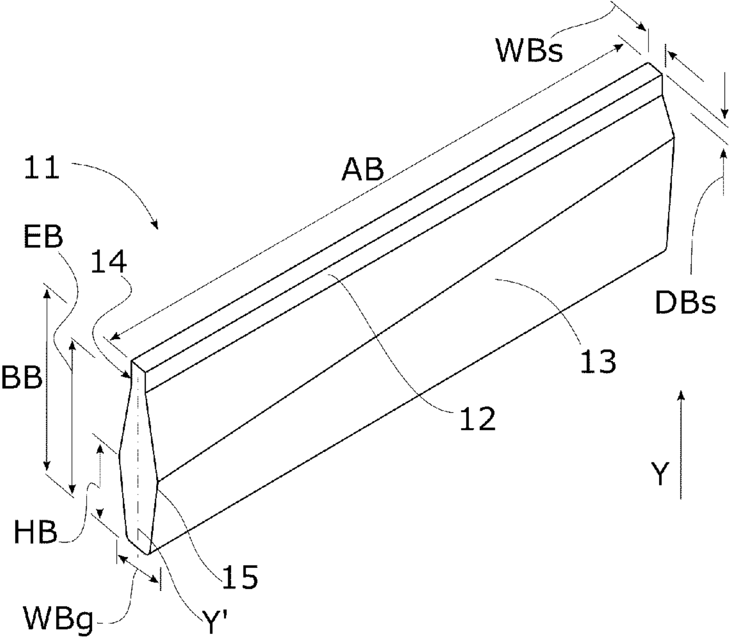
FIG. 4 is a perspective view of an exemplary blade used to form one embodiment of the invention.
Figures 8A, 8B:
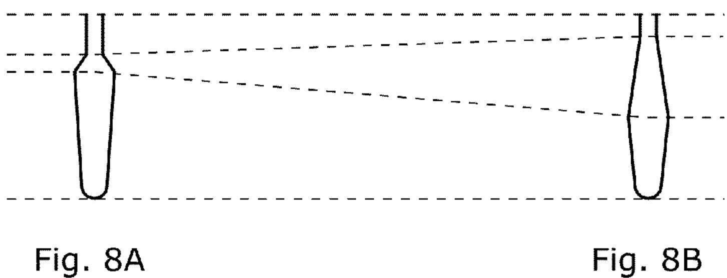
FIGS. 8A and 8B are sectional views of a groove-like recess along the corresponding lines in FIG. 7.

FIG. 4 illustrates a blade 11 used to form the groove-like recess of FIG. 2. During moulding of the tire tread, the blade 11 forms a groove-like recess 4 that has a profile corresponding to the blade configuration. Thus, in the following discussion, references to the blade pattern and dimensions are also applicable to the recess 4 formed therefrom and may be so referred to.

A first blade portion 12 is radially outwards and forms the corresponding sipe portion 6 of the free space 5. A second blade portion 13 forms the corresponding groove portion 7 of the free space. The second blade portion 13 is a radially inwards portion of the blade 11 connected to the first portion 12. The blade 11 has a longitudinal extension AB, a depth BB and a maximum width WBg. The first blade portion 12 has a first blade contour 14 of a width WBs and a depth DB s for forming the corresponding sipe contour 8 of the recess; the second blade portion 13 has a second blade contour 15 for forming the groove contour 9 of the recess, see FIG. 4. The second blade contour 15 has a longitudinal axis Y' and a height HB referred to a spatial extent EB in the direction of this longitudinal axis Y'. A local maximum WBg of the second blade contour 15 is bigger than a maximum width WBs of the first blade contour 14.

In a cross section of the recess, the sipe portion of the recess may have a substantially constant width Ws. Preferably, a passenger vehicle tyre may have a sipe width Ws between 0.4 mm and 1.4 mm, more preferred between 0.5 mm and 1 mm, more preferred between 0.6 mm and 0.9 mm. Preferably, a heavy duty tyre may have a sipe width Ws between 1 mm and 1.6 mm, more preferred between 1.1 mm and 1.5 mm, more preferred 1.2 mm or 1.5 mm.

The sipe portion 6 of the recess 4 may have a depth Ds in the range of 1 mm to 8 mm. In preferred embodiments, the sipe depth Ds for a passenger vehicle tyre may be in the range of 1.5 mm to 4 mm. Preferably, Ds may be in the range of from 1.5 mm to 3.5 mm. In preferred embodiments, heavy duty tyres may have a sipe depth Ds in the range of from 5 mm to 8 mm, more preferred from 5.5 mm to 6.5 mm.

In a cross section along the longitudinal extension A of the recess, between the ends, the groove portion 7 may have a changing width of the radially innermost position 19 of the groove contour 9. Preferably, 275/55 R20 passenger vehicle tyres may have a recess provided with a transition wherein the innermost width Wi ranges at one end of the transition between 0.8 mm and 1.4 mm, more preferred between 0.95 mm and 1.3 mm and ranges at the opposite end of the transition between 0.5 mm and 0.9 mm, preferably between 0.6 mm and 0.85 mm. Preferably, a 215/55 R16 passenger vehicle tyre may have a recess provided with a transition wherein the innermost width Wi ranges at one end of the transition between 0.7 mm and 1.2 mm, more preferred between 0.8 mm and 1.1 mm and ranges at the opposite end of the transition between 0.4 mm and 0.8 mm, preferably between 0.5 mm and 0.7 mm. Preferably, a 185/65 R14 passenger vehicle tyre may have a recess provided with a transition wherein the innermost width Wi ranges at one end of the transition between 0.6 mm and 1.1 mm, more preferred between 0.7 mm and 1.0 mm and ranges at the opposite end of the transition between 0.4 mm and 0.7 mm, preferably between 0.45 mm and 0.6 mm.

The extent E may be in the range of from 2 mm to 17 mm. In embodiments, a passenger vehicle tyre may have an extent E in the range of 2 mm to 6 mm, more preferred from 3 mm to 5 mm. In preferred embodiments, a heavy duty tyre, the extent E may range from 6 mm to 17 mm, preferably from 7 mm to 13 mm. In embodiments, the extent E may be in the range of from 14 mm to 17 mm.

The height H may be in the range 0.1 mm$<$H$<$E. Having the height H$<$E allows to configure the groove contour for ease of moulding and extraction of a moulding form. In preferred embodiments, the height H may be selected for a passenger vehicle tyre in the range of 0.1 mm to 6 mm, preferably from 0.3 mm to 5.9 mm, more preferred from 0.4 mm to 3 mm. For heavy duty tyre, the height H may be in the range of 3 mm to 14 mm, preferably from 6 mm to 13 mm, more preferred from 6 mm to 10 mm. In embodiments, the extent E is substantially constant along the at least one transition section of the groove portion 7, see FIG. 6A-6B, 9A-9B. The at least one transition section is provided having a changing height ΔH with the ratio ΔH/B in the range of $0.1 \leq \Delta AH/B \leq 0.2$, preferably $0.12 \leq \Delta H/B \leq 0.16$, particularly 0.15. In embodiments, the extent E changes along the at least one transition section of the groove portion 7, see FIG. 8A-8B, 12A-12B. In embodiments, at least one transition section is provided having a changing height ΔH with the ratio ΔH/B in the range of $\Delta H/B \leq 0.1$, preferably $0.15 \leq \Delta H/B \leq 0.6$, more preferred $0.2 \leq \Delta H/B \leq 0.4$.

In embodiments, the sipe portion 6 having the sipe contour 8 comprises at least one segment 16 that is inclined with respect to the radial axis X, see FIG. 13. The inclination angle γ may in the range $-45° \leq \gamma \leq 45°$, particularly $40° < \gamma < 40°$, preferably $25° < \gamma < 25°$.

In embodiments, the inclination angle γ changes along the at least one transition section in the range $-45° \leq \gamma \leq 45°$ so as to form a profile path opening to the tread surface 3 of a zigzag, wavy, sinusoidal or stepped configuration or a combination thereof. Due to this change of an angle γ sufficiently irregular surfaces of the opposing blocks may be provided for facilitating an engagement of the blocks with each other. The stiffness of the tread element may be increased without affecting a good grip to an underground significantly. Particularly the angle γ changes along at least one transition section of the extension A of the recess 4 in a range of $-40° < \gamma < 40°$, preferably in a range of $-25° < \gamma < 25°$.

FIGS. 15A-15B show the cross sectional contours of the recess provided with the at least one transition according to the invention wherein the sipe segment 16 has one inclination angle γ with respect to the radial axis at one end of the recess A-A and this angle transitions along the section so that the segment 16 at the other end B-B is oppositely inclined.

In embodiments, the recess with the at least one transition section has the sipe portion 6 provided with a three dimensional configuration wherein the sipe contour 8 comprises a plurality of inclined segments 16. The segments are inclined to each other along a connecting line by an angle β forming a zig-zag-extension in the width direction, and the angle β changes along the radial direction continuously, see FIG. 16.

In embodiments, the recess 4 may have an irregular sipe portion 6 inside the tread 2 so that the edges between two subsequent sipes may dig into softer undergrounds such as snow and/or through a wet underground. This leads to a good grip of a tyre with such a tread 2 even on low friction surfaces. At the same time, the sipe portion provides for high stiffness of the tread providing for maintained dry performance. Since the angle β between a consecutive segments of the sipe portion of a particularly zig-zag course of the sipe portion in radial direction is not constant or changes stepwise but changes continuously, adjacent blocks spaced by the sipe may easily engage each other so that the blocks may be interlocked increasing the stiffness of the tread. This increases the traction and braking performance of the tyre on dry high friction surfaces. Wear resistance is further increased due to reduced slipping of the tread elements. Due to the continuous change of angle the β between the first portion and the second portion a good grip and a high efficiency at low as well as at high friction surfaces can be provided such that a tyre with good grip to an underground is possible.

In embodiments, the sipe contour may comprise a plurality of inclined segments. The sipe portion 6 of the free space 5 may comprise a 3D interlocking sipe wherein the segments are inclined to each other along a connecting line by an angle β forming a zig-zag-extension in the width direction, see FIGS. 21A-21C. The angle β changes along the radial direction continuously. Also, the angle β changes continuously along the longitudinal extension A of the recess.

The sipe portion of the free space may provide for a sipe wherein the walls extend opposite each at a constant distance along the radial axis X. The sipe portion of the recess may comprise an interlocking sipe of substantially constant cross section along the longitudinal extension of the recess. Alternative embodiments are provided according to the invention, wherein the recess forms the free space comprising a sipe portion, said sipe portion comprising a so-called 3D interlocking sipe. Such sipe portion may provide for maintained grip to an underground during wet conditions.

Figure 10:
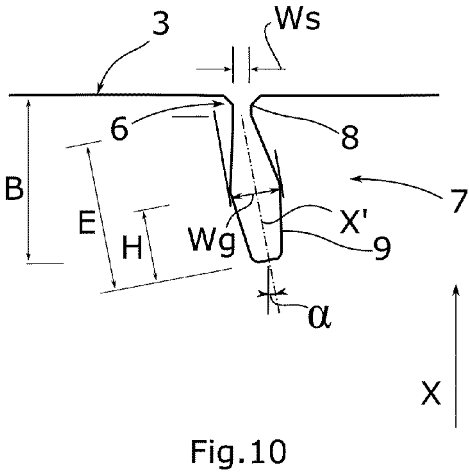
FIG. 10 is a sectional view of a fourth embodiment of the groove-like recess according to the invention.

Advantageous embodiments can be provided according to one aspect of the invention, wherein the recess 4 forming the free space 5 is provided to form a profile path on a worn-out tyre defined by the transition of the radially innermost position 19 of the recess. Exemplary embodiments may provide for the profile paths in FIG. 11, 20 and the corresponding sectional views of FIGS. 12A-12B and 21A-21C. At least one section may be provided with a path in a bent, zigzag, wavy and/or stepped shape. In embodiments, the blade 11 of FIGS. 18-19 may be used for forming a circumferentially extending recess having the advantageous profile paths described herein. The exact profile path for the innermost position 19 of the recess along the longitudinal extent A is within the purview of the tread designer. A In embodiments a profile path may be selected by providing the transition along the length of the groove for the angle α between the radial axis X and the symmetry axis X', see FIG. 10, 12A-12B. In embodiments, a profile path may be selected by providing the transition of the angle γ between the radial axis X and the segment 16. In embodiments, the angles α, γ and β may be advantageously selected to provide the profile path of the innermost position 19.

In embodiments, the tyre tread comprises a recess along the circumferential direction, wherein the distance along the length of the recess between two consecutive transitions is at most the longitudinal distance of four pitches, preferably at most the longitudinal distance of three pitches, more preferably at most the longitudinal distance of two pitches, more preferably at most the longitudinal distance of a single pitch. In preferred embodiments according to the invention, multiple transitions are provided in a single pitch and thus the distance along the length of the recess between two consecutive transitions is less than a pitch length.

In embodiments, the tyre tread comprises a recess along the axial direction, wherein the distance along the length of the recess between two consecutive transitions is at most the axial extent of a tread block. In preferred embodiments according to the invention, a blade 11 may be provided for forming one transition along the axial extent of a tread block, see FIG. 17D-17D'. In preferred embodiments, a blade 11 may be provided for forming a circumferentially extending recess 4 wherein at least two transitions are provided along the longitudinal extension A, see FIGS. 18-19.

Figures 17A, 17B, 17C, 17D, 17E, 17F:
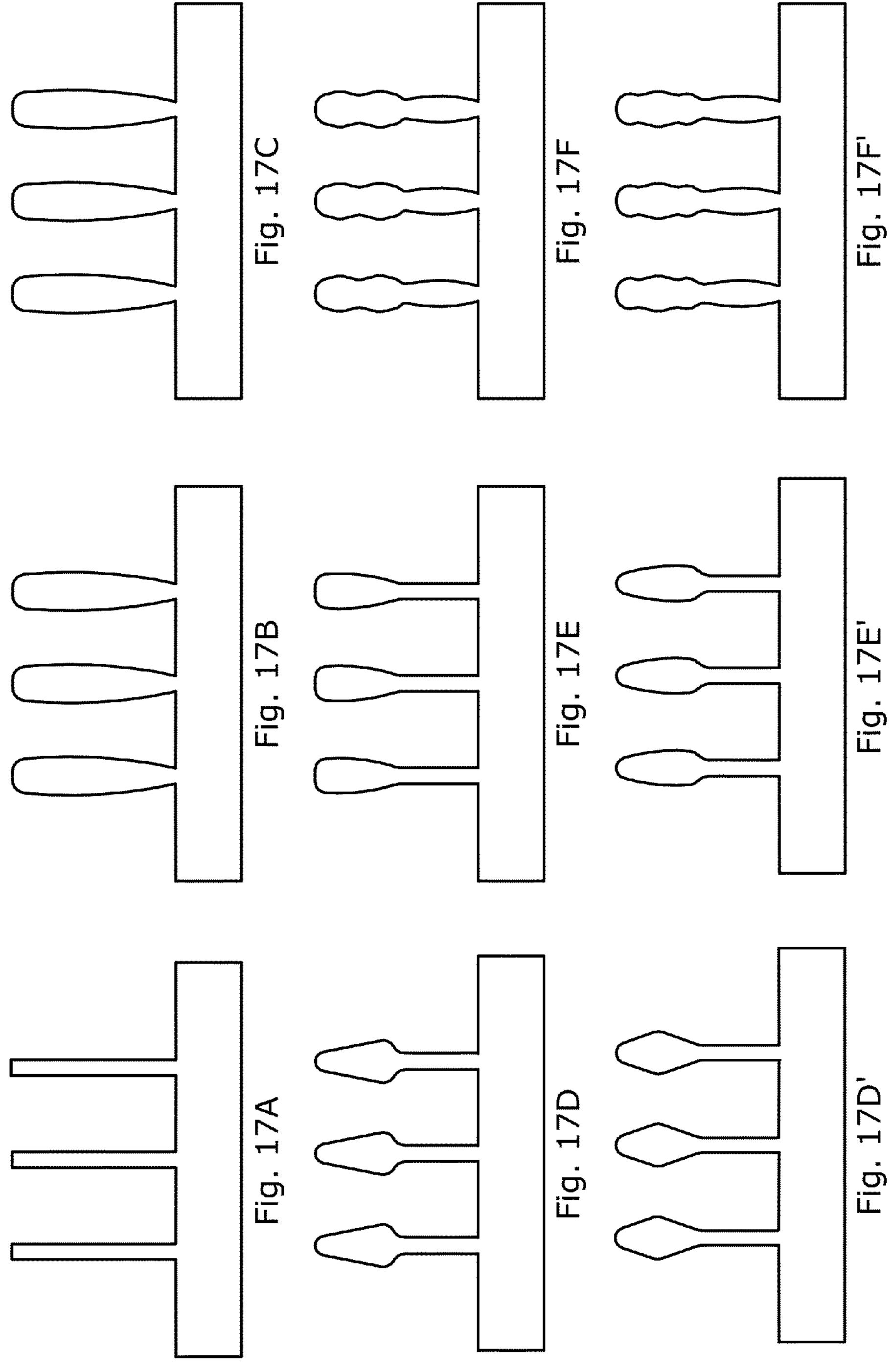
FIGS. 17A-17F' are sectional views of exemplary moulding forms according to the invention.

In one preferred embodiment according to the invention, the blade 11 is provided for forming a recess 4 having a groove portion 7 wherein the walls of the corresponding groove contour 9 define a cross sectional contour of a bean shaped geometry wherein four transitions per block are provided, see FIG. 17E-17E'.

In another preferred embodiment according to the invention, the blade 11 forms a groove portion wherein the walls of the corresponding groove contour define a peanut shaped geometry wherein 33 transitions per block are provided, see FIG. 17F-17F'.

FIGS. 17A-13F' illustrate the cross section of embodiments of a moulding form having blades 11 for forming recesses 4 according to the invention wherein the groove portion 7 of the free space 5 may have walls of different geometries, such as aerofoil shape, pringle shaped (hyperbolic paraboloid), and the groove contour 9 of the free space 5 may be in the form of hexagonal (or any other polygonal shape) panels, peanut shape, pasta contours, of may comprise segments of cycloidal shape, involute shape, evolute shape, hypocloid shape, epicycloid shape, teardrop shape, or hooves and transitions thereof.

In embodiments according to the invention, the distance between the walls of the groove contours can vary linearly or non-linearly along the length of the recess and over the depth B of the recess. It is believed that this advantageously reduces the stiffness of tread block in fresh (un-worn) tyres.

A worn tyre tread having a tread element 50 with at least one recess having a groove portion 7 provides for a total void ratio for a new tyre equal to the void ratio of the worn tyre, wherein the volume after wear of the sipes therefore is substantially equal to the volume of air lost from the wear of the grooves.

Figures 9A, 9B:
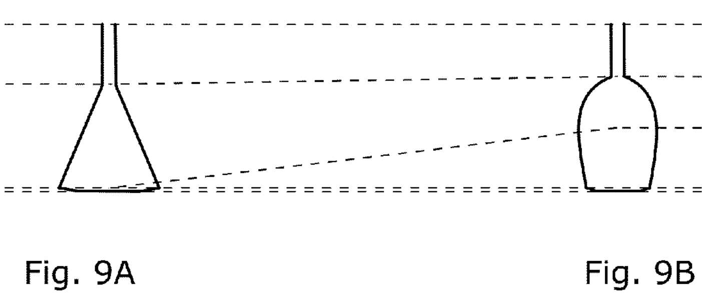
FIGS. 9A and 9B are sectional views of a third embodiment of the groove-like recess.

Advantageous embodiments according to the invention may be provided wherein the groove contour 9 of the cross sectional view of a recess 4 transitions from an elliptic contour shape on a cross section at one end 17 of the recess to a funnel shape on a cross section at the other end 18, see FIG. 9A-9B.

In embodiments, the groove contour forms a two-part geometry with a first substantially triangular nadir part and an elliptic zenith part, and wherein the sipe portion of the free space comprises a 3D interlocking sipe. In embodiments the groove base curvature varies from 0 to 3 mm.

EXAMPLES

Examples of the present invention will be described below, but the present invention is not limited to the following examples.

Example 1: Determination of Longitudinal Stiffness and Grip Performance

In this example, simulation and model prototype measurements are carried out to determine the advantages of the invention in terms of stiffness and grip performance.

A single block of tread material is modelled and simulated using Abaqus, the single block having a depth of 8 mm, a width of 27.62 mm and a length of 32.5 mm forming a rectangular contact surface. The block is modelled having three recesses with the cross sectional contours positioned at equal distances from each other along the width of the block and extending in a straight line along the length of the block. Three references (Ref. 1, Ref. 2, Ref. 3) are modelled, the first with prior art sipes devoid of a groove-like recess according to the present invention; the second Ref. 2 with prior art grooves having walls of elliptical cross sectional contours; and finally, the Ref. 3 is provided with three recesses having hyperbolic paraboloid contour walls (pringle shape). Three examples (E1-E3) are modelled and provided with three transforming recesses where the air to volume ratio is used as design parameter. Recess E1 was a groove-like recess according to the invention having one transition along the longitudinal extension of the recess. Recess E2 comprised a bean shaped recesses with 8.12 mm periodic transitions of the cross sectional contour. Example E3 comprised a peanut shaped recess with 1 mm periodic transitions of the cross sectional contour. Recesses E2 and E3 were designed also changing, along the length, the maximum width Wg of the groove portion.

The area was selected as parameter to be the block surface contact area, and was maintained substantially similar for the references and for the examples. The rubber volume was also used as parameter, and calculated for the reference as 27.62 mm*32.5 mm*8 mm−(6.2 mm*0.5 mm*32.5 mm)*3 mm. The simulation is set-up by providing a fixed surface opposite to a free contact area surface, with a compression load of 270N normal to the free contact area surface. Shear force is applied on the free surface wherein the linear friction coefficient $\mu=1$ is defined as input. Table 1 shows the design parameters and the longitudinal stiffness compared to the references. The sections S1, S2 indicated in Table 1 correspond to the extreme positions of the height H between the ends 17, 18 of the corresponding transition sections. The simulation results show a slightly decreased longitudinal stiffness of the inventive examples E1-E3.

TABLE 1

Model parameters and simulation results.

| | Ref 1 | Ref 2 | Ref 3 | E1 | | E2 | | E3 | |
|---|---|---|---|---|---|---|---|---|---|
| A (mm) | 32.5 | 32.5 | 32.5 | 32.5 | | 32.5 | | 32.5 | |
| α (degrees) | 0 | 0 | 0 | 0 | | 0 | | 0 | |
| B (mm) | 6.2 | 6.2 | 6.2 | 6.2 | | 6.2 | | 6.2 | |
| Section | S1 | S1 | S1 | S1 | S2 | S1 | S2 | S1 | S2 |
| E (mm) | — | 6.2 | 6.2 | 3.2 | 3.2 | 3.2 | 3.2 | 3.2 | 3.2 |
| H (mm) | — | 2.2 | 2.2 | 2.8 | 1.6 | 0.96 | 2.24 | 0.4 | 2.8 |
| Wg (mm) | — | 1.48 | 1.48 | 1.7 | | 1.48 | 1.4 | 1.7 | 1.35 |
| Ws (mm) | 0.5 | 0.5 | 0.5 | 0.5 | | 0.5 | | 0.5 | |
| Ds (mm) | 6.2 | 0 | 0 | 3 | | 3 | | 3 | |
| Rubber volume | 1.00 | 0.93 | 0.98 | 0.97 | | 0.97 | | 0.98 | |
| Contact area | 1.00 | 1.00 | 1.09 | 1.00 | | 1.00 | | 1.00 | |
| Long. stiffness | 1.00 | 0.94 | 0.99 | 0.98 | | 0.96 | | 0.98 | |

Six lab samples were prepared by forming and vulcanizing a single rubber block of tread material. Each rubber sample was formed with a depth of 8 mm, a width of 27.62 mm and a length of 32.5 mm and three recesses therein. The rubber material for the samples was a reference rubber compound formulation for a tyre tread. The reference compound comprised of 100 phr (parts per hundred rubber) of rubber, vulcanization system, additives, and silica with silane as filler system. The rubber samples were formed as tread elements using six moulding forms, each moulding form having three blades, and each blade prepared to form groove-like recesses in the rubber.

Three sets of reference blades were made with the cross sectional contours shown in FIGS. 17A-17C. The reference blades were used for forming the tread elements with the corresponding recess contours Ref 1-Ref 3 of Table 1. Three sets of inventive blades were made, having cross sectional contours as shown in FIGS. 17D-17F and FIGS. 17D'-17F' for forming the corresponding recess contours S1 and S2 of inventive examples E1-E3 of Table 1, respectively.

Measurements were conducted using the vulcanized rubber samples mounted on a Linear Friction Tester apparatus. The mounted rubber samples were used to estimate the grip during braking under dry, wet and snowy conditions. To replicate wet braking conditions with ABS, we considered that ABS operates in maximum friction region, so that the condition which poses the maximum friction was taken into account for two loads, replicating front and rear axle loading during braking. Table 2 shows the settings used to carry out the empirical measurements.

TABLE 2

Load and speed settings for the Linear Friction Tester (LFT).

| Load (kg) | Equivalent Press. (MPa) | Speeds (mm/s) |
|---|---|---|
| 21 | 0.248 | 100, 300, 500 |
| 41 | 0.468 | 100, 300, 500 |

A single rubber sample is used at each of the six load and speed setting combinations of Table 2. For each sample, three conditioning runs are made at a speed of 100 mm/s before each measurement run. Next, six measurements were made during each run. Resulting values were average of the six measurements.

Data from the LFT was captured in a friction graph and post processed selecting three different regions. The first region was used to average friction coefficient over the initial displacement of 0 mm to 5 mm, used to estimate initial stiffness. The second region was used to average the friction coefficient over the displacement of 0 mm to 10 mm, used to estimate sliding distance. Finally, the third region was used to average the friction coefficient over the displacement of 120 mm to 400 mm, used to estimate stable friction.

For the rubber samples comprising the inventive recesses E1-E3, measurements showed an advantageous reduction of initial stiffness in the first region, with comparable sliding distance and stable friction values. Surprisingly, the inventive design E1 showed advantageous grip under snow conditions for every speed and load regime.

Example 2: Flat Track Cornering Sweep

An inventive example set (PV1) of prototype pneumatic tyres HP A/S 215/60 R16 for passenger vehicles were manufactured and indoor performance was tested using a flat track machine. A set (Ref. 4) of prototype pneumatic tyres HP A/S tyres 215/60 R16 is used as the reference set. Both prototype tyre sets have identical construction and materials, and comprised a similar tread portion having two main longitudinal grooves dividing the tread surface into two shoulder areas at the axially outer tread regions, nearer to the sidewalls. For the PV1 tyres, each shoulder area was provided with a plurality of groove-like recesses in a substantially axial direction. The transitioning contours of a blade for forming the advantageous embodiment according to the invention are shown in each of the cross sectional views of FIG. 17D-17D'. For the Ref 4 tyres, the shoulder area was formed with straight sipes, not comprising the groove-like recesses. Parameter values for the groove-like recess in the PV1 prototype tyres are shown in the Table 3. The flat track was set up to measure cornering stiffness using a variable vertical load, as shown in Table 4, and 2.2 bar inflation pressure.

TABLE 3

Typical values for the groove-like recesses in PV1.

| | P1 | | P2 | | P3 | | P4 | | P5 | |
|---|---|---|---|---|---|---|---|---|---|---|
| A (mm) | 32.5 | | 32.5 | | 32.5 | | 32.5 | | 32.5 | |
| α (degrees) | 0 | 0 | 0 | 0 | 0 | 0 | 0 | 0 | 0 | 0 |
| B (mm) | 6.2 | 6.2 | 6.2 | 6.2 | 6.2 | 6.2 | 6.2 | 6.2 | 6.2 | 6.2 |
| Section | 8A | 8B | 8A | 8B | 8B | 8B | 8B | 8A | 8B | 8B |
| E (mm) | 3.2 | 4.55 | 3.2 | 4.55 | 3.2 | 4.55 | 3.2 | 4.55 | 3.2 | 4.55 |
| H (mm) | 2.8 | 1.6 | 2.8 | 1.6 | 2.8 | 1.6 | 2.8 | 1.6 | 2.8 | 1.6 |
| Wg (mm) | 1.4 | 1.6 | 1.5 | 1.8 | 1.7 | 1.9 | 1.2 | 1.4 | 1.3 | 1.5 |
| Ws (mm) | 0.5 | 0.5 | 0.5 | 0.5 | 0.5 | 0.5 | 0.5 | 0.5 | 0.5 | 0.5 |
| Ds (mm) | 3 | 1.65 | 3 | 1.65 | 1.65 | 1.65 | 1.65 | 3 | 1.65 | 1.65 |

TABLE 4

Flat track test results.

| Vertical Load | Cornering Stiffness in N/mm | |
|---|---|---|
| in N | Ref. 4 | PV1 |
| 7900 | 1632.77 | 1662.56 |
| 6300 | 1478.08 | 1504.01 |
| 4700 | 1258.3 | 1275.69 |
| 3100 | 925.66 | 927.95 |
| 1500 | 468.64 | 471.17 |

The cornering stiffness was not at all affected for the PV1 tyres when compared to the reference. This stiffness is assumed to lead to maintained performance of new tyres.

Example 3: Outdoor Testing of Passenger Vehicle Tyres

An inventive example set (PV2) of four prototype pneumatic tyres HP A/S 215/60 R16 were mounted on a rim and fitted on a Class C passenger vehicle. A set of four prior art tyres size 215/60 R16 (Ref 5) were mounted on a rim, and later fitted on the same passenger vehicle and used as control. Outdoor performance was tested for both tyre sets under identical conditions. The PV2 tyres were made having shoulder portions comprising the novel groove-like recess with identical parameters to PV1 tyres of Table 3. The total air to void ratio for a new PV2 tyre equals the air to void ratio of the worn tyre, wherein the volume after wear of the sipes therefore is equal to the volume of air lost from the wear of the lateral grooves. Both tyre sets are built with identical construction and materials.

The tyres were tested on an outdoor proving ground. Outdoor testing included the following performance tests: subjective ride rated by expert assessment, steering/light handling rated by expert assessment, lateral hydroplane rating by expert assessment, lateral hydroplane determining the objective lateral hydroplane speed, wet braking determining the objective average wet stopping distance, wet handling rating by expert assessment, wet handling determining the objective average lap time on a wet track, wet lateral grip determining the objective maximum wet lateral circle g-force, dry handling by determining the objective lane change speed, lane change rating by expert assessment, dry max handling rating by expert assessment.

Table 5 below shows the test results of the tyres PV2 in comparison to the reference tyres Ref 5. Both subjective ratings and objective measurements are shown. For the subjective ratings, the higher the score, the better the performance. The plus or minus (+ or −) signs designate minor changes, not enough to alter the "overall" rating. A rating change of +/−0.50 reports an observable and stable difference. Scores above 8.0 report clear and advantageous qualities that are easily observed by the driver. Scores above 7.0 are considered acceptable.

The test results exhibit in Table 5 show an improvement in wet performance for our inventive example PV2 tyres. The example tyres showed improved levels of wet handling, while other measures are substantially maintained.

TABLE 5

On-road evaluation of HP A/S tyres.

| Pattern/Construction | Ref 5 | PV2 |
|---|---|---|
| Size | 215/60R16 | 215/60R16 |
| Spec | HP A/S - Reference set | HP A/S |
| Ride | 7.25 | 7.25− |
| Steering/Light Handling | 7.25 | 7.25 |
| Lateral Hydroplane Rating | 7.25 | 7.5 |
| Lateral Hydroplane Speed (kph) | 86.9 | 88.51 |
| Wet Stopping Dist (avg m) | 41.7 | 41.42 |
| Wet Handling Rating | 7.75 | 8.25 |
| Wet Handling Lap Time (avg) | 54.83 | 54.3 |
| Wet Lateral Circle (G) | 0.76 | 0.78 |
| Lane Change Speed (kph) | 86.9 | 88.6 |
| Lane Change Rating | 7.5 | 7.5+ |
| Dry Max Handling Rating | 7.5 | 7.5+ |

Example 4: Winter Performance of Passenger Vehicle Tyres

In this field evaluation, an inventive example set PV3 of 215/60R16 high performance all season tyres are mounted on a rim and fitted to a Class C passenger vehicle. A reference set Ref 6 of 215/60R16 high performance all season tyres is used. Sets PV3 and Ref 6 are configured identical to the previous inventive and reference tyres, respectively The snow handling test was used to evaluate the handling behaviour of the passenger vehicle tyres under snow conditions. The test can be conducted on various proving grounds, both indoor and outdoor using compacted snow. The track has a hard packed base of more than 10 cm in thickness and a compaction index measured with a CTI penetrometer between 80 and 90. The track temperature, measured 1 cm deep from the track surface, should be lower than −2° C. Objective and subjective handling performances were evaluated. Both the example PV3 set and the reference Ref 6 set covered eight laps at the end of the test. Lap time were measured for the objective handling test.

Subjective performance ratings were obtained for all sets. A rating change of +/−0.50 or more reports an observable and stable difference. The objective measurements were obtained by measuring the total lap time of the vehicle for the selected track under identical conditions. The subjective ratings are shown in Table 6. The objective lap times are shown in Table 7, lower is better.

Surprisingly, subjective ratings show an improved grip to the underground under snow conditions for the PV3 prototypes comprising the novel groove-like recess. The objective lap times are reduced, showing the advantageous grip to the underground.

TABLE 6

On-road evaluation of HP A/S tyres.

| Pattern/Construction | Ref 6 | PV3 |
|---|---|---|
| Size | 215/60R16 | 215/60R16 |
| Spec | HP A/S - Reference set | HP A/S |
| Steering response, middle | 6 | 7 |
| Steering response, large angles | 5 | 6 |
| Controllability grip level | 6 | 7 |
| Controllability, limit | 6 | 7 |
| Controllability, over limit | 5 | 6 |
| Controllability grip loss reaction | 5 | 7 |
| Controllability throttle reaction ON/OFF | 5 | 6 |
| Braking, stability | 7 | 7 |
| Braking, curve | 6 | 6 |
| Acceleration, stability | 6 | 7 |
| Acceleration, curve | 5 | 7 |

TABLE 7

Track lap times of the objective snow handling test.

| Lap | 1 | 2 | 3 | 4 | 5 | 6 | 7 | 8 |
|---|---|---|---|---|---|---|---|---|
| Ref 6 | 32.85 | 33.16 | 32.75 | 32.71 | 33.11 | 32.71 | 32.49 | 33.36 |
| PV3 | 31.46 | 31.17 | 31.56 | 31.67 | 31.65 | 31.89 | 31.81 | 31.66 |

Example 5: Commercial Vehicle Tyres

Three inventive example sets of commercial vehicle tyres CV1-CV3 are built, having 4 prototype tyres each. The set CV1 is a set of 315/70 R22.5 Regional Drive tyres having circumferentially and axially extending groove-like recesses with parameters shown in Table 8. The set CV2 is a set of 265/70 R19.5 Regional Drive tyres having circumferentially and axially extending groove-like recesses with parameters shown in Table 9. The set CV3 is a set of 315/70 R22.5 Regional All wheel tyres having circumferentially extending groove-like recesses with parameters shown in Table 10.

For All of the ratios ΔH/B of the amount ΔH to the depth B, the ratios ΔE/B of the amount ΔE, the changes of the angles α of the longitudinal axis X', and the angles β for the inclined portions of the sipe contours are all within the scope of the present invention.

TABLE 8

Groove-like recess of a commercial vehicle tyre CV1.

| Section | 12A-12A | 12B-12B | 8A-8A | 8B-8B |
|---|---|---|---|---|
| A (mm) | 59 mm | | 47 mm | |
| α (degrees) | −10 | +10 | 0 | 0 |
| B (mm) | 17.8 | 17.8 | 17.8 | 17.8 |
| E (mm) | 11.80 | 12.00 | 14.8 | 16.1 |
| H (mm) | 10.00 | 6.00 | 13 | 8 |
| Wg (mm) | 4.2 | 4.2 | 4.2 | 4.2 |
| Ws (mm) | 1.5 | 1.5 | 1.5 | 1.5 |
| Ds (mm) | 6 | 5.8 | 3 | 1.65 |

TABLE 9

Groove-like recess of a commercial vehicle tyre CV2.

| Section | 12A-12A | 12B-12B | 8A-8A | 8B-8B |
|---|---|---|---|---|
| A (mm) | 50 | | 43 | |
| α (degrees) | −10 | +10 | 0 | 0 |
| B (mm) | 13.8 | 13.8 | 13.8 | 13.8 |
| E (mm) | 10.8 | 12.15 | 14.8 | 16.1 |
| H (mm) | 9 | 6.07 | 13 | 8 |
| Wg (mm) | 4.2 | 4.2 | 3 | 3 |
| Ws (mm) | 1.5 | 1.5 | 1.2 | 1.2 |
| Ds (mm) | 3 | 1.65 | 3 | 1.65 |

TABLE 9

Groove-like recess of a commercial vehicle tyre CV3.

| Section | 15A-15A | 15B-15B |
|---|---|---|
| A (mm) | 53 | |
| α (degrees) | 0 | 0 |
| β (degrees) | −17 | +17 |
| B (mm) | 14.8 | 14.8 |
| E (mm) | 7.4 | 7.4 |
| H (mm) | 3.7 | 5.9 |
| Wg (mm) | 5 | 5 |
| Ws (mm) | 1.2 | 1.2 |
| Ds (mm) | 7.4 | 7.4 |

CV1 and CV2 tyres have two types of groove-like recesses. A first type of recess configured to be circumferentially oriented with cross sectional contours shown in the exemplary embodiments of FIGS. 12A and 12B. A second type of recess axially oriented with cross sectional contours shown in FIGS. 8A and 8B. CV3 tyres have a single type of groove-like recess extending circumferentially with cross sectional contours shown in FIGS. 15A and 15B. FIGS. 7, 9 and 12 show the top views of the groove-like recesses within the scope of the present invention. The FIGS. 7, 11 and 14 indicate the sectional planes for the corresponding cross sectional contours of FIGS. 8A, 8B, 12A, 12B and 15B, respectively.

Additionally, the groove-like recess 4 in FIG. 2 may have depth B defined as a function of the non-skid depth, such as B=NSD−c, where c≥0. B may be equal to or smaller than the non-skid tread depth NSD. The depth B is preferably in the range of 60-100% of the NSD. When the sipe depth B is smaller than the non-skid tread depth NSD, the void to rubber ratio may be compensated during the wear life, resulting in better grip to an underground.

The invention claimed is:

1. A tyre, the tyre comprising:

a tread having a tread surface for contacting ground and at least one groove-like recess therein forming a free space, the recess having a longitudinal extension A along the surface and a depth B measured in a radial direction with respect to a radial axis of the tyre from the tread surface to a radially innermost position, the recess having a first end and a second end, the ends being opposite to each other along the longitudinal extension A, wherein the free space is divided into a sipe portion opening to the tread surface and a groove portion located beneath and radially inwards the sipe portion, wherein in a cross sectional view transverse to the longitudinal extension A of the recess the sipe portion has a sipe contour and the groove portion has a groove contour with a longitudinal axis (X') and an extent E between an upper end of the groove contour and a lower end of the groove contour, wherein a corresponding width of the groove contour has at least one local maximum width Wg at a height H of the groove contour in the direction of this longitudinal axis, wherein the maximum width Wg of the groove contour is bigger than a maximum width Ws of the sipe contour, and wherein the groove portion has at least one transition section along the longitudinal extension A of the recess, between the ends, wherein the height H having the maximum width Wg of the groove portion changes in this at least one transition section by an amount ΔH, wherein for the ratio ΔH/B of the amount ΔH to the depth B applies $\Delta H/B \geq 0.1$, wherein for the at least one transition section, the longitudinal axis X' of the groove contour is inclined with respect to the radial axis X of the tyre with an inclination angle α that changes in the range $-30° \leq \alpha \leq 30°$ so as to form a profile path for the radially innermost position of a zigzag, wavy, sinusoidal, or stepped configuration or a combination thereof, where the depth B is essentially constant, wherein for the at least one transition section the sipe portion has a configuration wherein the sipe contour comprises at least one segment that is oriented with respect to the radial axis X with inclination angle γ of 0° so as to form a profile path opening to the tread surface of a straight line, wherein the sipe portion has a straight trace in a longitudinal direction of the sipe portion.

2. The tyre according to claim 1, wherein for the at least one transition section the extent E changes by an amount ΔE, wherein for the ratio ΔE/B of the amount ΔE to the depth B applies $\Delta E/B \geq 0.01$.

3. The tyre according to claim 1, wherein for the at least one transition section the local maximum width Wg increases as the groove portion extends along the longitudinal extension A in the range of more than 5% to less than 40%.

4. The tyre according to claim 1, wherein the groove portion has a plurality of the transition sections, wherein the number of transition sections is in the range of 2 to 250.

5. The tyre according to claim 1, wherein for the ratio ΔH/B of the amount ΔH to the depth B applies $\Delta H/B \geq 0.2$.

6. The tyre according to claim 1, wherein the extent E changes by an amount ΔE, wherein for the ratio ΔE/B of the amount ΔE to the depth B applies $\Delta E/B \geq 0.05$.

7. Wheel for an automobile comprising a tyre rim for being connected to an axle of the automobile and a tyre according to claim 1 connected to the tyre rim.

8. Moulding form for vulcanizing a green tyre for a tyre, according to claim 1 comprising:

a mould casing for receiving a rubber material and at least one blade protruding radially inwards from the mould casing for forming the at least one groove-like recess into the rubber material, the blade having a longitudinal extension AB and a depth BB measured in a radial direction with respect to a radial axis Y of the mould casing and comprising:

a first blade portion for forming the sipe portion of the free space, and a second blade portion for forming the groove portion of the free space, said second blade portion connected to the first blade portion radially inwards the first blade portion, wherein in a cross sectional view transverse to the longitudinal extension AB of the blade, the first blade portion has a first blade contour and the second blade portion has a second blade contour with a longitudinal axis, wherein a corresponding width of the second blade contour has a local maximum width WBg at a height HB of the second blade contour in the direction of this longitudinal axis and an extent EB between an upper end of the second blade contour and a lower end of the second blade contour, wherein the maximum width WBg of the second blade contour is bigger than a maximum width WBs of the first blade contour, and wherein the second blade portion has at least one transition section along the longitudinal extension AB of the blade wherein the height HB having the maximum width WBg changes in this transition section by an amount ΔHB, wherein for the ratio ΔHB/BB of the amount ΔHB to the extension BB applies $\Delta HB/BB \geq 0.1$.

9. A tyre, the tyre comprising:

a tread having a tread surface for contacting ground and at least one groove-like recess therein forming a free space, the recess having a longitudinal extension A along the surface and a depth B measured in a radial direction with respect to a radial axis of the tyre from the tread surface to a radially innermost position, the recess having a first end and a second end, the ends being opposite to each other along the longitudinal extension A, wherein the free space is divided into a sipe portion opening to the tread surface and a groove portion located beneath and radially inwards the sipe portion, wherein in a cross sectional view transverse to the longitudinal extension A of the recess the sipe portion has a sipe contour and the groove portion has a groove contour with a longitudinal axis (X') and an extent E between an upper end of the groove contour and a lower end of the groove contour, wherein a corresponding width of the groove contour has at least one local maximum width Wg at a height H of the groove contour in the direction of this longitudinal axis, wherein the maximum width Wg of the groove contour is bigger than a maximum width Ws of the sipe contour, and wherein the groove portion has at least one transition section along the longitudinal extension A of the recess, between the ends, wherein the height H having the maximum width Wg of the groove portion changes in this at least one transition section by an amount ΔH, wherein for the ratio ΔH/B of the amount ΔH to the depth B applies $\Delta H/B \geq 0.1$, wherein for the at least one transition section, the longitudinal axis X' of the groove contour is oriented with respect to the radial axis X of the tyre with an inclination angle α of 0° so as to form a profile path for the radially innermost position of a straight line, where the depth B is essentially constant, wherein the extent E is essentially constant, wherein for the at least one transition section the sipe portion has a three dimensional configuration wherein the sipe contour comprises at least one segment that is inclined with respect to the radial axis X with inclination angle $\gamma$ that changes in the range $-45° \leq \gamma \leq 45°$ so as to form a profile path opening to the tread surface of a zigzag, wavy, sinusoidal or stepped configuration or a combination thereof, and wherein the groove portion has straight trace in a longitudinal direction of the groove portion.

10. A tyre, the tyre comprising:

a tread having a tread surface for contacting ground and at least one groove-like recess therein forming a free space, the recess having a longitudinal extension A along the surface and a depth B measured in a radial direction with respect to a radial axis of the tyre from the tread surface to a radially innermost position, the recess having a first end and a second end, the ends being opposite to each other along the longitudinal extension A, wherein the free space is divided into a sipe portion opening to the tread surface and a groove portion located beneath and radially inwards the sipe portion, wherein in a cross sectional view transverse to the longitudinal extension A of the recess the sipe portion has a sipe contour and the groove portion has a groove contour with a longitudinal axis (X') and an extent E between an upper end of the groove contour and a lower end of the groove contour, wherein a corresponding width of the groove contour has at least one local maximum width Wg at a height H of the groove contour in the direction of this longitudinal axis, wherein the maximum width Wg of the groove contour is bigger than a maximum width Ws of the sipe contour, wherein the groove portion has at least one transition section along the longitudinal extension A of the recess, between the ends, wherein the height H having the maximum width Wg of the groove portion changes in this at least one transition section by an amount $\Delta H$, wherein for the ratio $\Delta H/B$ of the amount $\Delta H$ to the depth B applies $\Delta H/\geq 0.1$, wherein for the at least one transition section, the longitudinal axis X' of the groove contour is inclined with respect to the radial axis X of the tyre with an inclination angle $\alpha$ in the range $-30° \leq \alpha \leq 30°$, and wherein the inclination angle $\alpha$ varies in the range $-30° \leq \alpha \leq 30°$ so as to form a profile path for the radially innermost position of a zigzag, wavy, sinusoidal, or stepped configuration or a combination thereof, where the depth B is essentially constant, wherein for the at least one transition section the sipe portion has a three dimensional configuration wherein the sipe contour comprises at least one segment that is inclined with respect to the radial axis X with inclination angle $\gamma$ that varies in the range $-45° \leq \gamma \leq 45°$ so as to form a profile path opening to the tread surface of a zigzag, wavy, sinusoidal or stepped configuration or a combination thereof, wherein $\alpha$ and $\gamma$ vary independently from each other, and wherein when $\alpha$ is positive, $\gamma$ is negative and when $\alpha$ is negative, $\gamma$ is positive.

* * * * *